T. E. KEARNEY & A. J. McFARLANE.
STREET CAR INDICATOR.
APPLICATION FILED MAY 5, 1913.

1,129,987.

Patented Mar. 2, 1915.
5 SHEETS—SHEET 1.

Witnesses

Inventors
Thomas E Kearney
and Angus J McFarlane

By
H. C. Schroeder
Attorney

T. E. KEARNEY & A. J. McFARLANE.
STREET CAR INDICATOR.
APPLICATION FILED MAY 5, 1913.

1,129,987.

Patented Mar. 2, 1915.
5 SHEETS—SHEET 2.

Witnesses
H. G. Stock
Frank H. Carty

Inventors
Thomas E. Kearney
and Angus J. McFarlane

By H. C. Schroeder
Attorney

T. E. KEARNEY & A. J. McFARLANE.
STREET CAR INDICATOR.
APPLICATION FILED MAY 5, 1913.

1,129,987.

Patented Mar. 2, 1915.
5 SHEETS—SHEET 4.

Inventors
Thomas E. Kearney
and Angus J. McFarlane

T. E. KEARNEY & A. J. McFARLANE.
STREET CAR INDICATOR.
APPLICATION FILED MAY 5, 1913.

1,129,987.

Patented Mar. 2, 1915.
5 SHEETS—SHEET 5.

Inventors
Thomas E. Kearney
and Angus J. McFarlane

UNITED STATES PATENT OFFICE.

THOMAS E. KEARNEY AND ANGUS J. McFARLANE, OF BERKELEY, CALIFORNIA.

STREET-CAR INDICATOR.

1,129,987. Specification of Letters Patent. Patented Mar. 2, 1915.

Application filed May 5, 1913. Serial No. 765,497.

*To all whom it may concern:*

Be it known that we, THOMAS E. KEARNEY and ANGUS J. McFARLANE, citizens of the United States, residing at Berkeley, in the county of Alameda and State of California, have invented certain new and useful Improvements in Street-Car Indicators, of which the following is a specification.

This invention relates to street car indicators, and particularly to that type of indicators which displays the name of the street which the car is approaching, and across which the said car will travel, by means of suitable apparatus located within the car and within view of the passengers therein, in connection with means on the outside of the car for actuating the indicator within, the principal object of the invention being to produce such a device as will be adapted for use on street cars of the ordinary electric type, and with which the said cars may be transferred to other routes in the city in which they are being operated without the necessity of changing the indicator or adjusting or altering the same in any way.

Another object is to produce such an indicating system as can be adapted to indicate the name of the street or station any desired distance from the said street or station.

A further object is to produce a device with which the name of any street, station, business house, etc., of any number of letters may be spelled out and located centrally and neatly on the indicator box, and which takes up a relatively small amount of space in the car.

A final object resides in the particular arrangement and combination of parts hereinafter described.

In the accompanying drawings.

In several views of the drawings the same part is designated by the same reference character.

Referring more particularly to the drawings, and to the reference characters marked thereon, 1 represents in general the selector mechanism and other apparatus carried on the top of the trolley pole.

2 represents in a general way the mechanism for actuating the selector mechanism, the said actuating mechanism being located on and connected to the trolley wire and the span wires for the same.

3 represents in a general way the indicator box and mechanism therein, said box and mechanism being suitably located within the street car.

Referring now more particularly to the selector apparatus 1, the same comprises a frame 4 having a downwardly extending slanting arm 5, adapted to be connected to the trolley pole 6, and insulated therefrom as shown. The slant of said arm 5 is such that when the trolley pole is in contact with the trolley wire 6ª, the frame 4 is substantially horizontal.

Figures 3, 4, 5, 6:
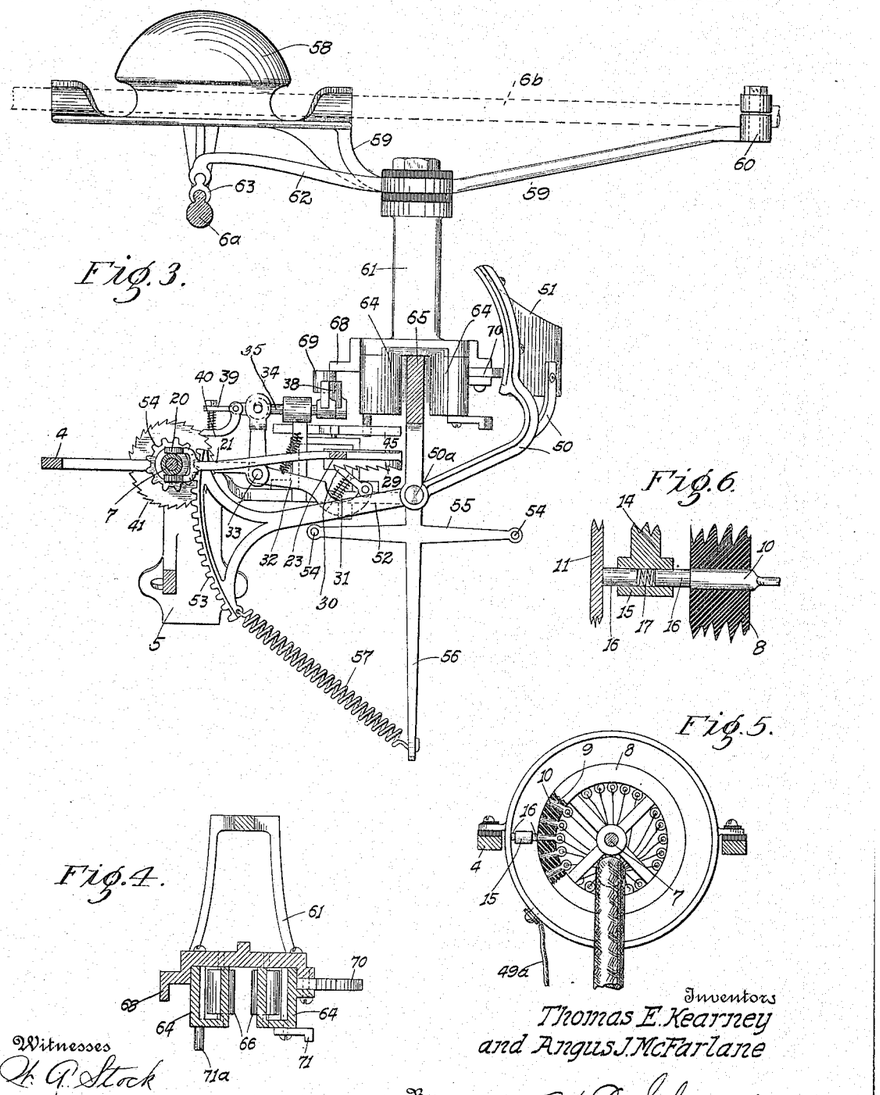
Fig. 3 is a sectional view taken on the line 3—3 of Fig. 1 looking in the direction of the arrows.
Fig. 4 is a cross section on the line 4—4 of Fig. 1 looking in the direction of the arrows.
Fig. 5 is an end elevation, partly in section, of the contact mechanism of the selector.
Fig. 6 is a cross section of the outer end of the contacts on the selector.

Journaled horizontally in the frame 4 and extending in the same general direction as the trolley pole is a rotatable shaft 7 at one end of which is placed a stationary cylindrical hollow selector drum 8 which is rigidly secured to the frame 4. Around the drum 8 is a casing 11 of conducting material carried by the frame 4 but insulated therefrom. The drum 8 is made of non-conducting material and is provided with a plurality of holes 9 arranged in parallel rows which are parallel to the direction of the shaft 7. Each of the holes 9 contains a contact pin 10 of conducting material, one end of which is flush with the outer surface of the drum and the other end projects through into the hollow interior of the drum. As best shown in Fig. 5, the inner ends of the pins 10 are provided with eyes whereby they may be connected to suitable wires.

Mounted on the shaft 7 and adapted to rotate with the same close to one end of the drum 8, is an arm 12 extending outwardly from the shaft, a distance somewhat greater than the radius of said drum and having a sleeve 13 on the outer end thereof. A shaft 14 is slidably mounted in said sleeve 13 and one end thereof is provided with a hollow head 15 which projects over the drum 8. As best shown in Fig. 6, the head 15 contains a pair of pins 16 which project from opposite ends of the head and are pressed apart by a coil spring 17 located in said head 15 between the two pins. One of the pins 16 contacts with the inner face of the casing 11 and the other contacts with one of the pins 10 set into the drum 8.

Figure 1:
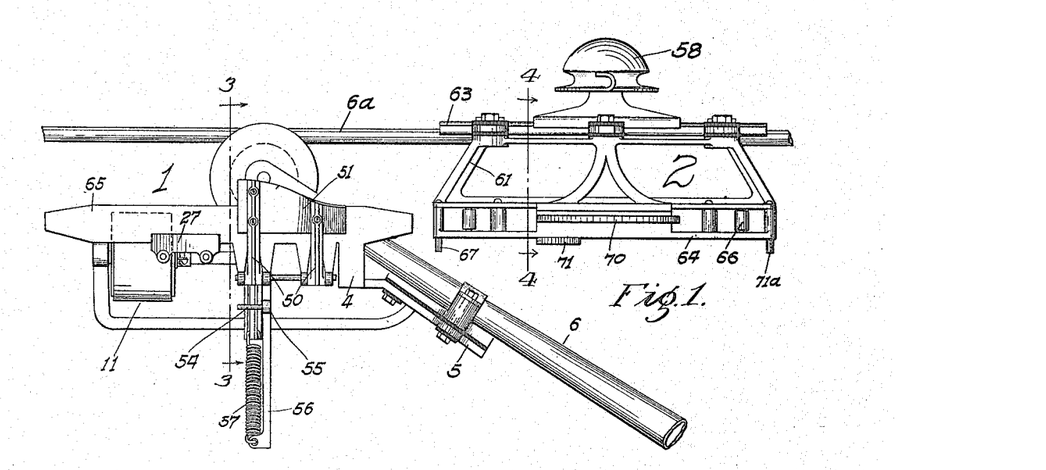
—Figure 1 is a side elevation of the upper part of a trolley pole of a street car showing our improved indicator selector mounted thereon, and the means for actuating the selector mounted on the trolley wire.
Figure 2:
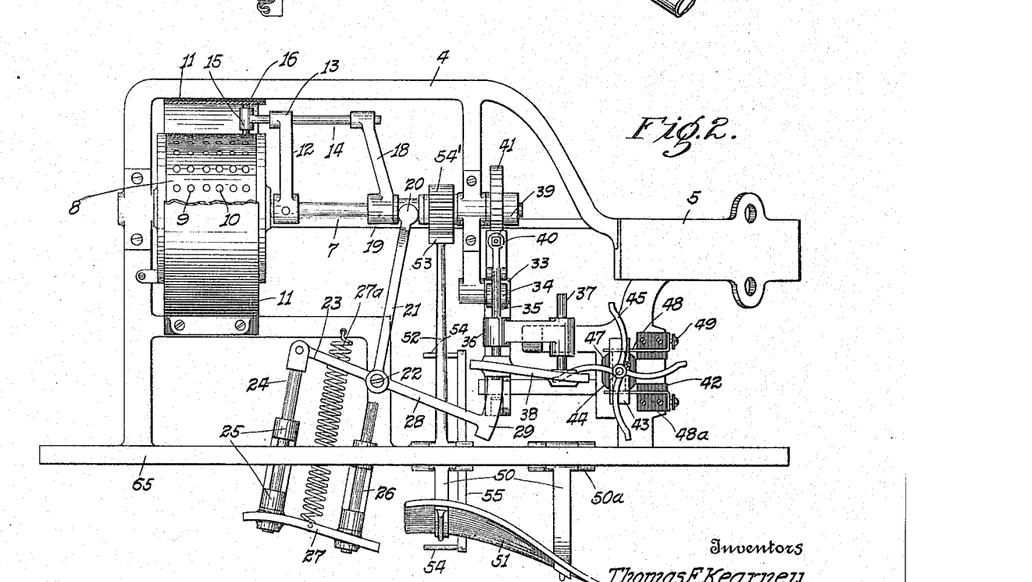
Fig. 2 is a top plan view of the selector, the trolley wire and pole being removed and certain parts being broken away for purposes of illustration.

It will be understood that each of the pins 10 controls suitable mechanism whereby the name of a street which the car is approaching may be announced or indicated in the car, and that said mechanism is actuated when an electric current passes through the pins 10 from the pins or brushes 16. It will be understood that the apparatus illustrated in Figs. 1, 2 and 3 is adapted to position the head 15 of the rod or shaft 14 so that the pins 16 may contact with any one of the pins 10 as desired and also is adapted to send an electric current through the pins 16 into the pins 10 at the proper time.

The end of the shaft 14, opposite the head 15, is secured to the end of an arm 18 which is carried by a sleeve 19, said sleeve 19 being slidably mounted on the shaft 7. The sleeve 19 is cut away in the usual manner so to provide a recess for the reception of the fork 20 of the shifting lever 21 which is pivoted as at 22 to the frame 4. The lever 21 is provided with two arms 23 and 28 which extend in opposite directions from the pivot point 22. The arm 23 is pivotally connected with the end of a rod 24 which is slidably mounted in suitable collars such as 25 which are supported from the bar 65, said bar being rigid with the frame 4. Parallel to the rod 24 and mounted in a similar manner is a circuit rod 26, rods 24 and 26 being connected by a curved operating member 27. A spring 27$^a$ is provided which is attached to member 27 and also the frame 4. It is obvious that rods 24 and 26 in combination with their supports provide a means whereby movement of the member 27 will be properly guided and inserted and, at the same time, will have little frictional opposition. It will also be seen that the spring 27$^a$ tends normally to maintain the sleeve 19, and consequently the brushes 16, in the position shown in Fig. 2. In order to hold the sleeve 19 and lever 21 against pull of the spring 27$^a$ when it is desired to do so, I provide on the end of the arm 28 a segment 29 which is provided with teeth on its under surface. Mounted below the plane of the segment 29 is a bell crank lever 32, best shown in Fig. 3, which is mounted to turn in a vertical plane, and one end of which extends beneath the segment 29 and has pivoted thereto a dog 30, said dog being thrown upwardly into engagement with the teeth of the segment 29 by means of a spring 31. The lever 32 is pivoted to the frame 4 as at the point 33 and has an arm extending upwardly from the point 33 to a point 34 where said upright arm has pin connection with a horizontal rod 35 by which it is normally prevented from moving.

From the foregoing it will be apparent that in order to bring the pins 16 into alinement with any particular row of pins 10 extending circumferentially around the drum 8, it is only necessary to move the member 27 the desired distance against the action of the spring 27$^a$ and that the pins 16 will be held in the proper axial position relative to the drum 8 by means of engagement between dogs 30 and the teeth of the member 29. It will be understood that the teeth on the segment 29 are so adjusted that the pins 16 are sure to be in alinement with one of the circumferential rows of pins 10 when the dog 30 is securely seated against one of said teeth.

In order to accomplish the rotative movement of the shaft 7 and the pins 16, we provide two arms 50 which are pivoted to the frame 4 at point 50$^a$. Said arms 50 are curved upwardly at their outer ends and carry an upwardly extending curved operating member 51. One of the arms 50 is provided with an integral extension 52 which extends from the point 50$^a$ toward the shaft 7. On its outer or left hand end as shown in Fig. 3, the extension 52 is provided with a segmental gear 53 which meshes with a pinion 54′ on the shaft 7. As clearly shown in Fig. 3, the extension 52 is provided with downward extension 56, and a spring 57 connects the end of the extension 56 and the lower end of the gear 53 so that the latter is normally held in its lowermost position as shown in Fig. 3. When, however, the member 51 is pushed downwardly by any suitable means, the gear 53 is raised and by means of a pinion 54′ the shaft 7 is rotated and consequently the pins 16 are rotated likewise. The shaft 7 is provided with a ratchet wheel 41 which is adapted to hold the shaft 7 in such a position that the pins 16 shall always stop in alinement with one of the longitudinal rows of the pins 10. The ratchet wheel 41 is so held by means of a spring pressed pawl 40 carried by an extension 39 of the rod 35 previously mentioned. The rod 35 is supported and guided by a sleeve 36 which is rigid with the frame 4 and, at the end removed from pawl 40, the rod 35 is connected to a spring controlled actuating member 38, member 38 being connected also to an additional guide member 37 parallel to 35 which is also seated in the frame 4.

Figure 7:
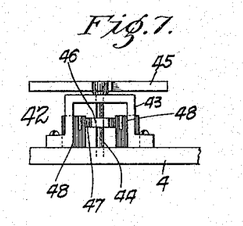
Fig. 7 is a detail view showing in elevation a switch for actuating the indicator mechanism.

From the foregoing it will be seen that when the member 38 is moved away from the shaft 7, dog 30 and pawl 40 will both be withdrawn from engagement with the teeth of the members 29 and 41, respectively, and that the shaft 7 will thereupon be carried by the springs 57 and 27ª back to the normal or zero position which is shown in Figs. 2 and 3. The means for operating the members 27, 38 and 51, respectively, form a part of the mechanism 2, previously mentioned as carried on the trolley wire and on the span wires connected thereto, and this mechanism will be shown and described. The frame 4, however, carries certain switch mechanism which is plainly shown in Fig. 2 and illustrated in detail in Fig. 7, which will be described previous to the description of mechanism 2.

The switch mechanism just mentioned is situated to the right of members 37 and 38 as shown in Fig. 2, and is designated in general by the numeral 42. Mechanism 42 comprises a vertical shaft 44 which is journaled in the frame 4 and an arched member 43 attached thereto. At the upper end of the shaft 44 are four curved arms 45. Attached to the shaft 44, beneath the arch 43, is a disk 46 which is of conducting material but is provided with flattened sides which are faced with non-conducting plates such as 47. We also provide two spring contact members 48 which are mounted in insulating blocks 48ª, carried by the frame 4. The members 48 contact with the disk 46 on opposite sides thereof as clearly shown in Fig. 2, and are provided with suitable terminals such as 49, one of which is connected with a source of current supply and the other of which is connected to the casing 11 by a wire such as 49ª, as shown in Fig. 5. It will be clearly seen from Fig. 2 that by turning the disk 46 90 degrees the springs 48 are changed from contact with the conducting portion of disk 46 to contact with the insulating plates 47, or vice versa, depending upon the relative position of the disk and the spring when the movement is initiated.

Before passing to the description of the mechanism 2, it should be pointed out that the vertical member 56, shown in Fig. 3, carries a horizontal cross bar 55 integral therewith which carries in turn, at its outer end, the pins 54 which project into the path of movement of the arms 50 and 52 so as to limit the movement of the segmental gear 53. It should also be understood that the pins 54 are set so that one complete stroke of the gear 53 turns the shaft 7 to a complete revolution.

Figure 9:
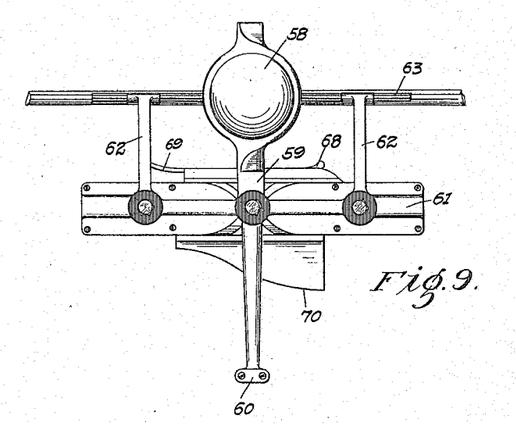
Fig. 9 is a plan view showing the means of attaching the selector actuating means to the trolley wire structure.

The means for operating the switch mechanism 42 as well as the operating members 27, 38 and 51, is comprised within the mechanism 2, and is supported from trolley wires 6ª and one of the span wires therefor such as 6ᵇ. As clearly shown in Figs. 1 and 3, 58 represents one of the usual span wire insulators or supports. To the support 58 is welded an extension 59, the farther end of which is clamped to the span wire as at 60. Bolted to the extension 59, and insulated therefrom, is a vertical frame member 61 which extends parallel to the trolley wire and, as clearly shown in Fig. 9, carries two braces 62 which are attached thereto near its end and insulated therefrom. The ends of the braces 62 are adapted to fit over the trolley wire clamp 63.

Figure 8:
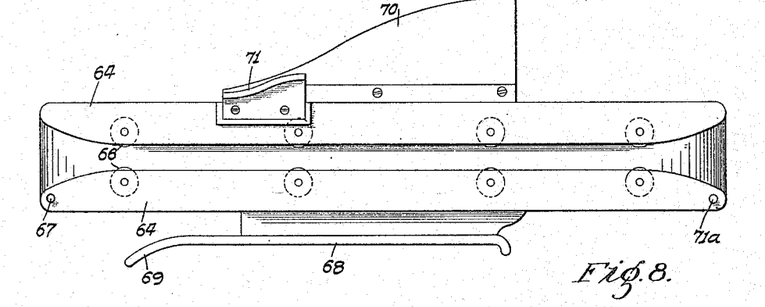
Fig. 8 is an inverted plan view of the selector actuating means.

At its lower end the frame 61 is provided with two horizontally extending flanges and extending downwardly from said flanges are vertical rollers 66, the lower ends of which are journaled in longitudinally extending members 64 which are turned up at the ends and attached to the frame 61, as clearly shown in Fig. 1. As best shown in Fig. 8 there are two members 64 between which is a flaring groove, and the members 66 are set so as to project somewhat into this groove. As clearly shown in Fig. 3, the guide member 65 previously mentioned as being rigid with the frame 4, is intended to pass into the groove between the two members 64 and be guided by the rollers 66 so as to hold the parts of the mechanism 1 in proper position so as to be operated by the coacting members of the mechanism 2. In order to operate the member 27, and thereby actuate the pins 16 longitudinally of the axis of the drum 8, the mechanism 2 is provided with a member 71 which projects from the lower edge of one of the members 64. Member 71 is suitably curved so as to provide an easy movement for the member 27 when the latter is carried against it. Attached to the frame member 64 and the previously mentioned member 71 is a second operating member 70 which extends horizontally and is suitably curved so as to actuate the member 51, the member 70 being adapted to contact with the inner vertical face of the member 51. In order to actuate the member 38 and release ratchet members 29 and 41 from their respective pawls or dogs, we provide a member 68 which extends from the other of the two members 64 on the opposite side of the frame 61 from member 70 and which is provided with a curved end 69 for the purpose of causing an easy and gradual movement of the member 38. Carried by opposite ends of the last mentioned member 64 are also two pins 67 and 71ª which project downwardly therefrom, the member 67 being adapted to engage first with one of the arms 45 for the purpose of operating the switch mechanism 42 and it is intended that the pin 67 shall place the said switch mechanism 42 in such a position that the circuit therethrough is broken. Ratchet members 29 and 41 are next released by the operation of member 69 so that springs 27ª and 57 return the mechanism 1 to the zero position shown in Figs. 2 and 3. Next the members 27 and 51 are actuated by members 71 and 70, respectively, to set the mechanism 1 so that pins 16 shall contact with the desired pin 10 in the drum 8, and the pin 71ª operates the switch mechanism 42 so that current is sent through the desired pin to actuate the signal mechanism 3 and display the name of the desired street.

It will be seen that members 70 and 71 control the name of the street to be displayed and consequently we make these members removable and changeable at will and a device having mechanism similar to mechanism 2 is provided along the trolley wire for each street or station at which the car is to stop, and each of these stations or devices is provided with members such as 70 and 71 which have a different amount of curvature to thus provide a different setting for the pin 16 for each street or station.

Figure 10:
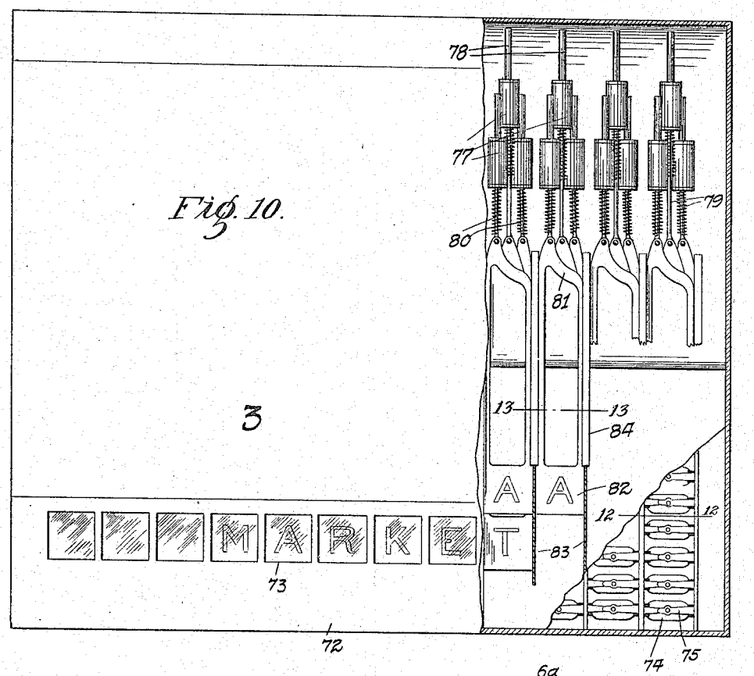
Fig. 10 is a front elevation, partly broken away to show the interior mechanism of the indicator box.
Figure 11:
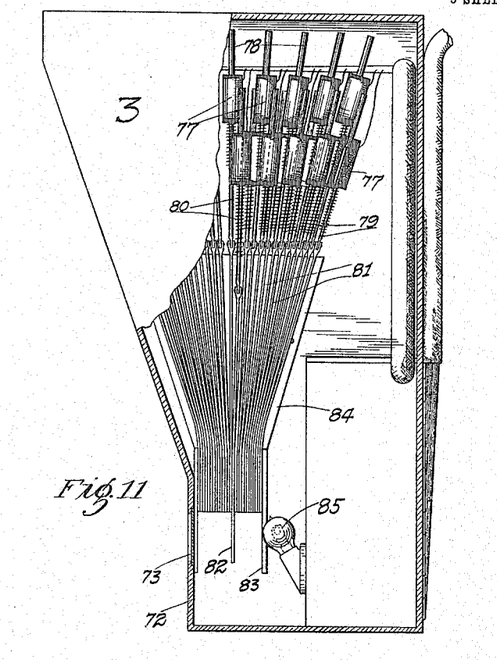
Fig. 11 is an end elevation of an indicator box with the casing partly broken away.
Figures 12, 13:
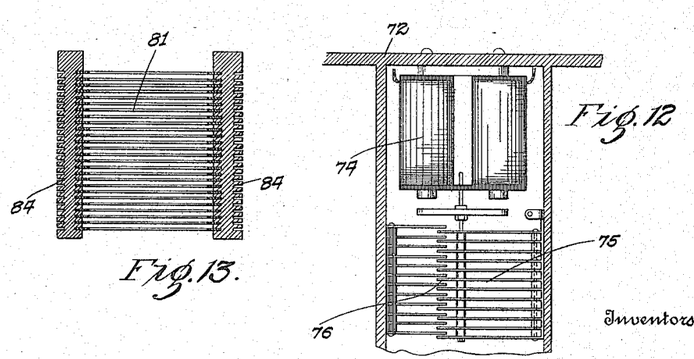
Fig. 12 is an enlarged sectional view on the line 12—12 of Fig. 10.
Fig. 13 is an enlarged sectional view on the line 13—13 of Fig. 10.
Figure 14:
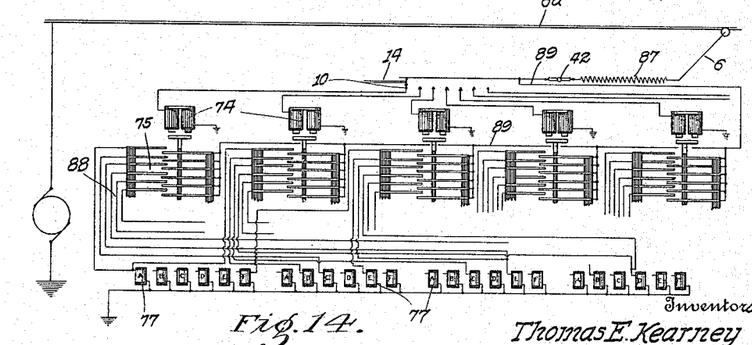
Fig. 14 is a diagrammatical view of the electrical circuits employed in connection with the selector and indicator mechanism.

Referring now to the indicator mechanism 3 which is mounted in the car, it will be seen from Figs. 10 and 11 that we have provided a casing or indicator box 72 which is suitably located in the car and has, horizontally across the lower portion of the same, a plurality of square openings 73, there being as many of these as there are letters in any name likely to be encountered along the route of the car, say for instance, 12. Located anywhere conveniently in the casing 72 are a plurality of magnets 74, there being as many of these magnets 74 as there are pins 10 in the drum 8, each of said pins being connected directly to its respective magnet. As indicated in Figs. 12 and 14, each of the magnets 74 controls a switch such as 75 comprising spring contacts such as 76 which are preferably arranged in banks, one above the other, as shown in Fig. 12, and of which there are as many as there are orifices in the casing 72, in this case 12.

Located in the casing 72, above the opening 73, is a plurality of solenoids such as 77 arranged in groups, there being as many solenoids in each group as there are letters of the alphabet, and as many groups as there are orifices 73. Consequently, in this case we provide twelve groups of twenty-six solenoids each. The solenoids 77 are preferably arranged as shown in Figs. 10 and 11 so as to occupy as little space as possible. Each of these solenoids has an iron core 78 which normally extends above the solenoid as clearly shown in Fig. 11, being held in this position by springs such as 80 which are coiled about stems 79, said stems being attached to the cores 78, being made of brass or other nonmagnetic material. The stems 79 extend through the center of the solenoids and downwardly therefrom and carry at their lower ends members 81, the latter members having at their lower ends plates 82 of either opaque or translucent material as desired, said plates having printed thereon some letter of the alphabet, it being so arranged that there will be a different letter on each plate 82 situated in a given group of solenoids.

The plates 82 are preferably made of very thin material so that the twenty-six together will not be very thick. For this reason they are wedged together by means of guides 83 and the members 81, where the same branch out to meet the stems 79, are provided with guide members 84 as shown in Fig. 13, so that there will be no tendency on the part of the same to buckle. Translucent material is used for the plates 82 and electric lights such as 85 indicated in Fig. 11, may be located in the casing behind the plates.

It is of course obvious that the maker or assembler of this device must know, beforehand, the exact names of the streets on which the device is to be operated, before he can correctly make up the same. We will suppose therefore that some certain pin 10 is intended to control the display of some such word as "Market." For this purpose, such pin is coupled with one of the magnets 74 shown in Fig. 12. Six of the spring contacts 75 belonging to this particular magnet 74 are then selected and six wires are run from such contact to six different solenoids in as many different groups, one of said wires being led to an M solenoid, the next to an A solenoid, and so on, care being taken in so doing to see that the six letters are connected to solenoids in adjacent groups so that there will be no space between any two letters. Care should also be taken that the wires mentioned are connected to groups which are centered with regard to the number of spaces or openings 73 in the casing 72. In this way all of the magnets 74 and solenoids 77 are connected up, or as many as are needed to present the names of the streets along the route on which the car is to be operated.

The circuits employed in operating the above mentioned apparatus are particularly shown in Fig. 14. As shown in said figure current is taken from a grounded circuit through the pole 6, passes out through the resistance 87, from which it passes to the switch mechanism 42. The switch mechanism 42 is connected directly to the insulating conducting casing 11 within which are mounted the pins 10. By the mechanism previously described the arm 14 is adapted to be set so as to make connection between the casing 11 and any one of the pins 10. As shown in Fig. 14, connection is made between casing 11 and a particular pin 10 at the extreme left of the row indicated. From this particular pin 10 circuit leads direct to the magnet such as 74 at the left of the figure, and from thence directly to ground. When current passes through magnet 74 its spring contacts 75 are all closed. The contacts 75 of all of the magnets 74 are connected to a common conductor 89 which leads back to the main line near the switch mechanism 42. Consequently, when these contacts are closed, current passes therethrough into the line 88 leading therefrom, and from thence into such of the solenoids 77 as it is intended to control from any one of the particular magnets 74. Each of the solenoids 77 is directly connected to ground as clearly shown in Fig. 14. It will be noted in Fig. 14 that we have shown a set of five magnets and six solenoids only and that the magnet on the left of said figure has three contacts connected up so as to spell the word "Ace" through and by means of three solenoids connected therewith.

From the foregoing it will be obvious that in the operation of our apparatus various devices corresponding to the mechanism 2 are distributed at points along the route to be followed by the car, and that the mechanism such as 3 is attached to each car and coöperates with the mechanism 2 at various points so as to first set the switch mechanism in position to open the circuit. Consequently all of the letters in the plates 82 are drawn up out of sight by means of the springs 80. The mechanism 3 is then actuated so as to set the pin 16 in contact with another pin 10 corresponding to another street or station and then the switch mechanism 42 is again placed in position to close the circuit whereupon the proper magnets and solenoids are actuated to display the name of the desired street or station. Should it be necessary for any reason to back the car up without reversing the trolley pole, the pole may be pulled down thus breaking the circuit and allowing the mechanism 3 to return to normal position, whereupon, when the pole is restored so that the trolley wheel contacts with the wire, the name will again be indicated, the circuit being momentarily interrupted only by the pins 6 and 7 when the apparatus passes this point.

It will be understood that while we have shown and described the preferred form of our invention, we do not wish to be limited thereto, and various mechanical and electrical equivalents may be substituted for the parts and arrangement shown and described herein without departing from the spirit of our invention as claimed; and that parts of our invention may be used without utilizing the whole.

Having thus described our invention, what we claim is:—

1. A station indicating device comprising in combination, a contact mechanism adapted to be fixed at a point along the path of the car, mechanism adapted to be operated by said contact mechanism carried on the exterior of a car, and adapted to assume a position corresponding to a given street or station, and electrical devices mounted within the car adapted to display a name of a street or station corresponding to the position assumed by said second mentioned mechanism, said contact mechanism being arranged to interrupt the circuits of said electrical devices during the period when said second mentioned mechanism is being operated and close said circuit when said second mentioned mechanism has assumed its desired position.

2. A selective indicating mechanism for displaying the names of streets or stations comprising a device adapted to be supported on a trolley wire, selective mechanism mounted on the end of a trolley pole adapted to be operated by said device and to assume a position corresponding to the name of a street or station to be displayed, and electrically controlled mechanism carried within the car and controlled by said selector mechanism and adapted to display a name corresponding to the position of said mechanism, the circuit of said last mentioned mechanism being carried up on the trolley pole and said device being arranged to first break and then make the circuit.

3. In a system for indicating the names of streets and stations in cars, the combination of one or more devices disposed along the route of the car, said devices being provided with actuating surfaces, selecting mechanism carried by a car and adapted to be actuated by said surfaces, said selecting mechanism comprising a plurality of contact points and a contact head adapted to make connection with any one of said points, indicator mechanism mounted within the car adapted to display the names of streets or stations, said indicating mechanism being provided with means for displaying the names of a plurality of streets or stations, said means being connected individually to said contact points, and means for sending an electric current through said contact head and any one of said points with which it is in contact whereby the name of a particular street will be displayed.

4. In a system for indicating the names of streets or stations, the combination of one or more switch actuating devices disposed along the route of the car, selector mechanism carried on the exterior of the car adapted to be actuated by said devices so as to assume a position corresponding to the desired street or station, said mechanism being provided with a non-conducting cylindrical surface and having a plurality of contact points set therearound and arranged in rows both axially and circumferentially, a contact pin adapted to make connection with any of said points, means for producing a relative motion between said pin and said point longitudinally of said cylindrical surface, means for producing a relative motion between said pin and said point circumferentially of said surface, and an indicating device placed within the car provided with a plurality of controlling magnets each of which is directly connected to one of said contact points, and a plurality of sets of display mechanism each of which is controlled by one of said electromagnets, each of said sets being adapted to display the name of a given street or station, and means for passing a current of electricity through said pin, contact points and magnets.

5. A system for displaying the names of streets or stations comprising in combination, one or more devices fixed along the route of the car, each of said devices being provided with actuating members, selector mechanism carried exterior to the car adapted to be actuated by said devices so as to assume a position corresponding to a given street or station, said selector mechanism comprising a number of fixed contact points arranged on a cylindrical surface and placed in alinement both axially and circumferentially of said surface, a contact pin, a rod on which said contact pin is mounted, a shaft coaxial with said surface, an arm rigid with said shaft provided with a sleeve in which said rod is slidably mounted, a sleeve slidably mounted on said shaft and having an arm to which said rod is attached, said sleeve being fixed against rotation relative to said shaft, means controlled from said devices for rotating said shaft, means controlled from said devices for moving said sleeve longitudinally of said shaft, means for holding said shaft in the position set by said means aforesaid, means for releasing said last mentioned means also controlled from said device, and a display apparatus mounted within the car comprising a plurality of sets of devices each set being connected to one of said contact points and adapted to display the name of a particular street or station, and means for passing an electric current from said contact pin into any one of said contact points with which it is associated.

6. In a system for displaying the names of streets or stations, the combination of one or more fixed controlling devices provided with actuating surfaces and disposed at suitable points along the route of a car, a selecting mechanism carried by the car adapted to be actuated by said controlling devices, said selecting mechanism being provided with a plurality of contact points, and a display apparatus disposed within the car and adapted to display the name of a plurality of streets or stations each of which corresponds to a particular point in said selector mechanism, said selector mechanism being provided with means coöperating with said contact surfaces on said devices for first breaking the circuit through said contact points, means adapted to operate after a circuit has been broken for returning said selector mechanism to a zero or normal position, means operating after the mechanism has been returned to a zero position for setting said mechanism in position corresponding to the desired street or station, means acting subsequent to the setting means for passing an electric current through the selected contact point, the display mechanism connected to said points being adapted to be operated by an electric current received therefrom.

7. In a system for displaying the names of streets or stations, the combination of one or more devices disposed along the route of the car, a selector mechanism carried on the exterior of the car provided with a plurality of contact points each of which corresponds to a particular station or street to be indicated, display mechanism carried within the car comprising a plurality of control magnets each of which is electrically connected to one of said contact points, and a plurality of solenoids arranged in groups there being 26 of said solenoids in each group and each solenoid being adapted to display when actuated a single letter of the alphabet, switches adapted to be actuated by said control magnets, connections leading from one side of said switches to such of said solenoids as are necessary to display the name of a street or station which corresponds to a particular contact point and control magnet, means for sending an electric current through any desired contact point and control magnet, and means for sending an electric circuit through any switches closed by a control magnet.

8. In a system for indicating the name of a street or station, a display mechanism comprising a box provided with a plurality of apertures, a plurality of groups of solenoids equal to the number of said apertures, each of said groups comprising 26 solenoids and each of said solenoids being adapted to project a single letter of the alphabet into such position that it may be seen through one of said apertures, control magnets, and switches adapted to be controlled by said control magnets, each of said switches controlling connections leading to such of said solenoids as are necessary to display the name of a desired street or station when said solenoids are actuated.

9. In a system for indicating the names of streets or stations, the combination of one or more control devices adapted to be supported on a trolley wire, each of said devices being provided with a frame, two sets of rollers supported by said frame, three cam-like actuating surfaces supported by said frame, two pins also supported by said frame one at each end thereof, and selecting and current controlling mechanism adapted to be supported on the trolley pole, said mechanism being provided with a frame having a guide mechanism adapted to pass between said sets of rollers whereby said mechanism and said device may be held in proper relative operating positions, a drum of insulating material fixed on said frame, a plurality of contact points fixed flush with the cylindrical surface of said drum, and arranged in rows both axially and circumferentially of said drum, a conducting casing surrounding said drum and spaced therefrom, a sleeve-like head disposed between said drum and casing, a pair of pins carried within said head, said pins being of conducting material, a spring disposed between said pins whereby one is pressed against said drum and the other against the casing, a rod rigid with said head, a shaft coacting with said drum rotatively mounted on said frame, an arm rigid with said shaft provided with a sleeve in which said rod is slidably mounted, a sleeve mounted on said shaft adapted to slide longitudinally thereof but fixed against relative rotation thereto, an arm carried by said sleeve which is rigidly attached to said rod, a bell lever pivoted to said frame adapted to move said sleeve longitudinally of said shaft said bell lever having an arm provided with ratchet teeth and an arm connected to an operating member, a spring for resisting the motion of said lever caused by said operating member and for returning the same to zero position when released, a dog adapted to coöperate with said ratchet teeth for holding said bell lever in the position set by said operating member, a pinion on said shaft, a lever pivoted to said frame provided with gear means for rotating the pinion, an operating member attached to said last mentioned lever, a ratchet wheel on said shaft, a pawl adapted to coact with said ratchet wheel to hold said shaft in the position in which it is set by said pinion and coacting lever, a spring adapted to oppose the motion of said last mentioned lever and to return said shaft to its zero or normal position when said pawl is released from said ratchet wheel, an operating member provided with connections adapted to release said pawl from said ratchet wheel and said dog from said teeth, a switch provided with two positions in one of which it is adapted to pass current through said casing into said pins and contact points, and in the other of which it is adapted to interrupt electrical communication with said casing, said switch being provided with members whereby one of said pins on said device first opens the circuit of said contact points, the actuating surfaces on said device next operating the member in said mechanism for disengaging said pawl and said dog from said ratchet wheel and piece respectively, next operating said bell lever to displace said sleeve axially of said shaft, next operating the member connected with said second mentioned lever whereby said shaft is rotated, and the second of said pins next throwing said switch into position to close the circuit to said casing, and display mechanism provided with a plurality of groups of electrically controlled apparatus, magnets for controlling said apparatus, each of said magnets being connected to one of said contact pins, and switches controlled by said magnets having connections with said apparatus whereby when one of said switches is closed by its corresponding magnet, the name of a particular station or street is displayed by said apparatus.

10. In a system for indicating the names of streets or stations, a display mechanism comprising a case, a plurality of groups of display devices mounted within said case, each of said devices being provided with an element having thereon a separate character to be displayed, a separate solenoid for actuating each of said devices, a spring for retracting each device to its normal position, a plurality of switches each having a plurality of contacts, separate ones of said contacts being connected to solenoids in separate groups, and automatic means for actuating the switch desired.

11. In a system for indicating the names of streets or stations, a display mechanism comprising a case, a plurality of groups of display devices mounted within said case, each of said devices being provided with an element having thereon a separate character to be displayed, a separate solenoid for actuating each of said devices, a spring for retracting each device to its normal position, and a plurality of switches each having a plurality of contacts, separate ones of said contacts being connected to solenoids in separate groups, an electromagnet for actuating each of said switches, and automatic means for closing the circuit of the electromagnet desired.

In testimony whereof we affix our signatures in presence of two witnesses.

THOMAS E. KEARNEY.
ANGUS J. McFARLANE.

Witnesses:
F. P. SCHROEDER,
FRANK H. CARTER.

Copies of this patent may be obtained for five cents each, by addressing the "Commissioner of Patents, Washington, D. C."